Dec. 14, 1937.   J. C. MERWIN ET AL   2,102,571
VALVE FOR CONTROLLING PLASTIC CONCRETE MIXTURES
Filed Nov. 18, 1933   3 Sheets—Sheet 3
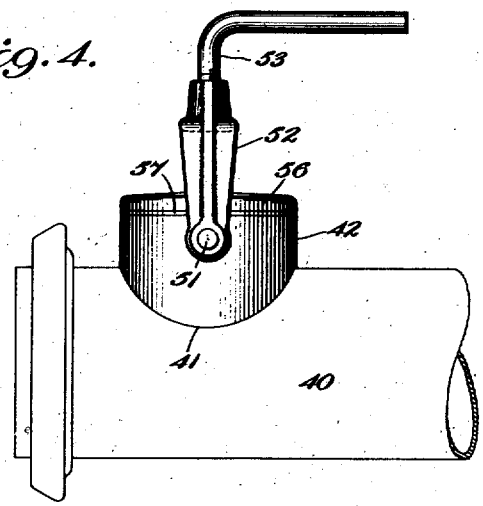
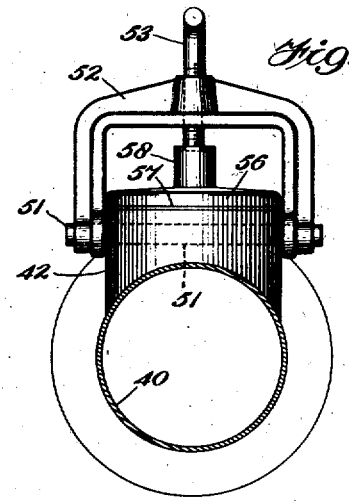
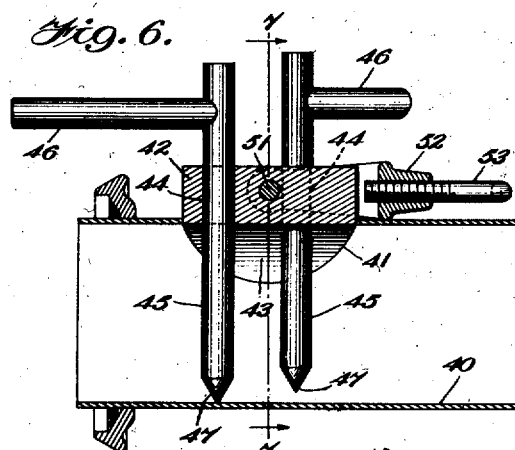
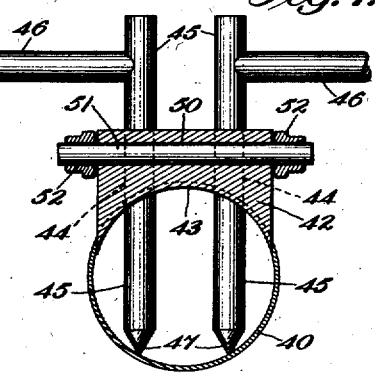
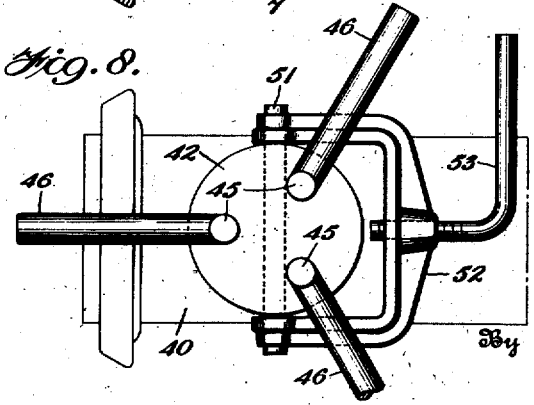
Inventors
John C. Merwin, and
Rudolph F. Lindow,
By Barker & Collings
Attorneys Patented Dec. 14, 1937

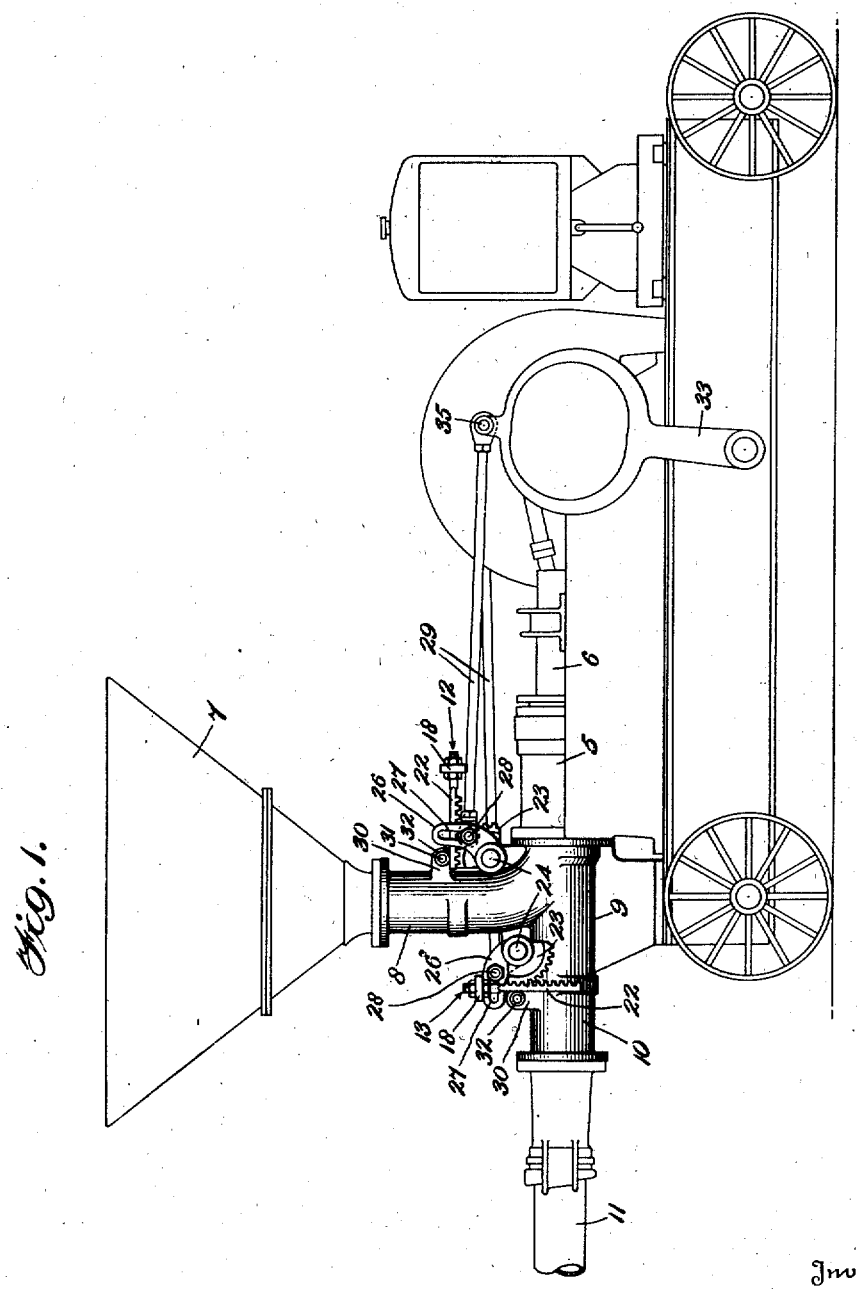

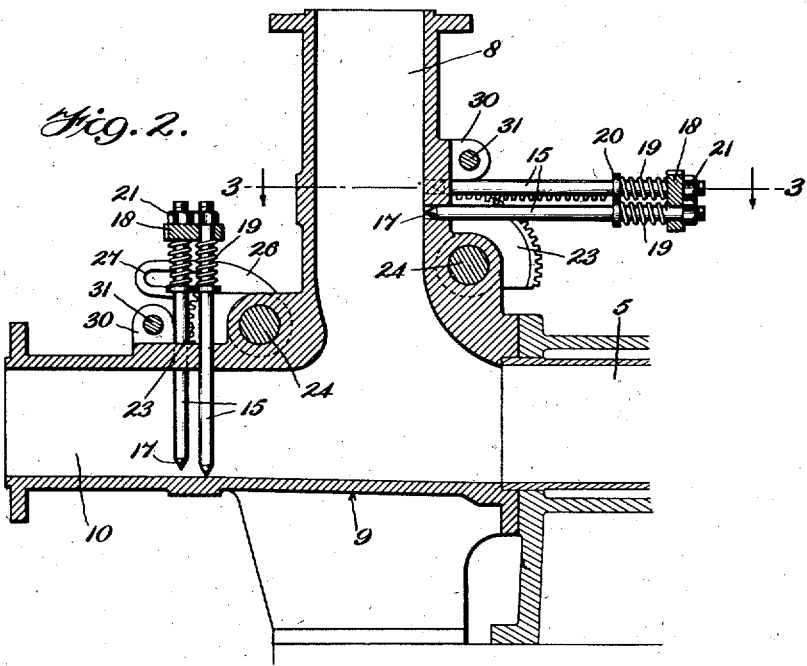

2,102,571

UNITED STATES PATENT OFFICE 2,102,571

VALVE FOR CONTROLLING PLASTIC CONCRETE MIXTURES

John C. Merwin and Rudolph F. Lindow, Milwaukee, Wis., assignors to Chain Belt Company, Milwaukee, Wis., a corporation of Wisconsin Application November 18, 1933, Serial No. 698,716

3 Claims. (Cl. 83—73)

This invention relates to valves for controlling the flow of plastic concrete mixtures and has for one of its objects to provide a valve structure specially adapted for use in connection with such mixtures, which will be simple in construction, comparatively inexpensive to manufacture and more efficient in operation than those which have been heretofore proposed.

Concrete as defined by the American Concrete Institute is "a mixture in which a paste of Portland cement and water binds fine and coarse materials, known as aggregates, into a rock-like mass as the paste hardens through the chemical action of the cement and the water". The most commonly used form of fine aggregate is sand, while gravel and crushed rock are the most common forms of coarse aggregate. Any aggregate up to ¼" in greatest dimension is considered fine, while coarse aggregates in present day commercial use may range from ¼" up to 3" or more in greatest dimension. The proportions of the various constituents vary within a relatively wide range but in substantially all of the commonly used mixes the coarse aggregates comprise a substantial percentage of the total bulk. For example in one of the most commonly used mixes, i. e. the 1—2—4 mix, there is one part of cement to two parts of sand and four parts of gravel or crushed rock, and it will be readily apparent that in such a mixture the coarse aggregate constitutes more than 50% of the mixture.

A normal concrete mixture such as the above which has a large percentage of solid pieces of irregular shape, even in the so-called "wet mixes", does not follow the well recognized laws of fluids. For example, a liquid or gas flowing through a closed conduit at a given rate, upon encountering a restriction or obstruction in such conduit will increase its velocity at that point in passing the obstruction, whereas a plastic concrete mixture upon encountering a similar restriction or obstruction will reduce its velocity and tend to pack or stow at such point so as to completely stop the flow. This stowing property is due to a large extent to the presence in the mixture of the pieces of coarse aggregate which resist to a marked extent any force tending to change their relative positions within the mixture.

Because of this peculiar stowing property possessed by plastic concrete mixtures it has been found impractical to employ the well-known types of valves, such as ball valves, mushroom valves, flap valves and the like, which are commonly used for controlling the flow of liquids and gases, largely because of the tortuous passages and obstructions imposed by the valve parts when in their open positions. On the other hand, there has been recently developed a type of oscillating plug valve having passageways through it of uniform diameter and complete clearances between its moving parts which has been successfully used in the controlling of movements of plastic concrete mixtures.

It has also been proposed to employ the ordinary type of sliding gate valve in controlling concrete mixtures but experience has shown that with the usual type designed for handling fluids the pressures upon the gate are so great as to require an excessive amount of force in moving the same to and from its closed position, and the wear upon the parts is also very excessive.

It is the primary object of the present invention to provide a simple and effective valve construction in which the above objections are overcome, in that it will require a minimum amount of power to operate, and replacements of worn valve members may be quickly and easily effected without dismantling the entire valve.

With the above and other objects in view which will appear as the description proceeds, the invention consists in the novel details of construction and combinations of parts more fully hereinafter described and particularly pointed out in the appended claims.

Referring to the accompanying drawings forming a part of this specification in which like reference characters designate like parts in all the views:—

Figure 1 is a side elevational view of a well known form of mechanical concrete pump provided with inlet and outlet valve structures in accordance with the present invention;

Figure 2 is an enlarged central vertical sectional view through the valve structure shown in Figure 1;

Figure 3 is a horizontal sectional plan view taken approximately on the plane indicated by the line 3—3 of Figure 2;

Figure 4 is a fragmentary side elevational view of a pipe section provided with a modified form of valve construction more especially adapted for use as a stop valve in a pipe line, the parts being shown in the open position of the valve;

Figure 5 is an end elevational view of the parts shown in Figure 4, as seen from the right of the latter figure;

Figure 6 is a central longitudinal sectional view of the modified form of valve, illustrating the "closed" position thereof;

Figure 7 is a transverse sectional view, taken approximately on the plane indicated by the line 7—7 of Figure 6; and Figure 8 is a top plan view of the parts illustrated in Figure 6.

The prior art valves above mentioned have been used principally as the inlet and outlet valves of a recently developed form of mechanical pump capable of handling all normal plastic concrete mixtures, which pump is known to the trade as "Pumpcrete", and for purposes of disclosure, the present invention has been illustrated in Figures 1, 2 and 3 as applied to such a pump, although it will be readily understood that it is not necessarily limited thereto, but with slight changes in the structure may be adapted for use as a stop valve in pipe line concrete transportation systems, one example thereof being illustrated in Figures 4 to 8, inclusive.

The pump illustrated in Figure 1 comprises a cylinder 5, a piston 6 working therein, a feed hopper 7, communicating with the inlet passage 8 of a valve housing 9 which may also embody in the same structure the outlet passage 10 communicating with the discharge line 11. The valve housing 9 is joined to one end of the cylinder 5 substantially as shown and its inlet passage 8 is controlled by a valve structure 12 while the outlet passage 10 is controlled by valve structure 13.

As best shown in Figures 2 and 3, each of these valves may comprise a plurality of spaced rods or prongs 15 which are slidably mounted in apertures 16 formed in the wall of the valve housing so that they may be slid transversely of their respective passages to partially obstruct the same. The inner ends of the prongs 15 are preferably pointed as at 17, while the outer ends thereof are slidably received in a cross head 18 with springs or other resilient elements 19 being interposed between the said cross head and abutments 20 provided with each prong, whereby there is provided a yielding, slidable connection between the prongs and the cross head. The extreme end of each prong carries a nut 21 for limiting the movement of the prong relative to the cross head in one direction.

The cross head 18 also has rigidly secured to it a pair of spaced racks 22 which extend substantially parallel to the prongs 15 and the teeth of which are engaged by the companion teeth of the gear sectors 23, which are rigidly carried by the shaft 24 suitably journalled in the wall to the housing 9. The said shaft also rigidly carries an actuating member 25 having the arms 26, provided with slots 27, for receiving the connecting pin 28 of the valve actuating rod 29 by means of which the valve is moved to and from closed position. The pump is provided with a pair of valve actuating rock levers 33, one for each valve, the one controlling the inlet being shown in Figure 1, which rock levers are actuated by suitable cams carried or driven by the crank shaft of the pump, as is usual in this particular apparatus. The valve housing is preferably provided with lugs 30 adjacent each set of valve prongs, in which are mounted transverse shafts 31 upon the outer ends of which are rotatable guide rolls 32 which bear against the rear faces of the racks 22 to take the thrust of the gears 23, and maintain the racks in operative position.

In operation the inlet and outlet sets of prongs are moved alternately into and out of their respective passageways 8 and 10 in timed relation to each other and to the movements of the pump piston 6, by the rock levers 33 and actuating rods 29, to control the flow of the material in such passages, substantially the same as any other pump. The prongs being of materially less diameter than that of the passageways do not completely close off the passages but they interpose sufficient obstruction therein to produce the stowing action of the concrete mixture, whereby its flow may be stopped as above explained. Because of the relatively small cross sectional area of the prongs, and the pointed ends of the same, they may be forced through the mixture to closed position with the use of materially less power than would be required in case of a solid gate valve such as was mentioned above. Likewise, in the event the prongs become worn and it is necessary to replace them, the operation may be quickly and easily effected by simply backing off on the nuts 21, sliding the prongs forwardly to disengage the outer ends thereof from the cross head so that the springs 19 may be removed and then moving the prongs in the opposite direction until their inner ends are disengaged from the apertures 16, whereupon a new prong may be put in place by a reverse operation.

Should one or more of the prongs encounter a piece of large aggregate during its closing operation, which piece is directly in the path of travel of the prong, the spring 19 thereof will yield and permit the prong to stop short of its maximum travel without damage to the prong or calling upon it to crush the aggregate. This spring arrangement eliminates the necessity for the relatively complicated yieldable construction of the actuating rods 29 heretofore employed; and by reason of the fact that the slots 27 in arms 26 are struck upon an arc, the center of which is the axis of the pin 35 which connects the rod 29 to the rock lever 33, the pin 28 which pivotally connects the said rods 29 to the valve actuating arms 26 may be positioned outwardly or inwardly in the said slots to decrease or increase the travel of the valve prongs 15 without the necessity of shortening or lengthening the rod to maintain the zero or open position of the valve constant. The connections 29 may thus take the form of plain solid or tubular rods instead of the complicated structures heretofore deemed necessary.

In the modified form of the invention illustrated in Figures 4 to 8 inclusive, which is more especially adapted for use as a stop valve in the pipe line, the valve housing is constituted by a section 40 of the pipe which may be either a standard section, 10 feet in length, or may be a shorter section in order to facilitate the placing of the valve in the line. This housing section is provided with an opening 41 into which is inserted, and rigidly secured by welding or otherwise, a plug member 42 having a concave surface 43 which conforms to the inner circumference of the pipe section 40, as will be clear from Figures 6 and 7. The member 42 is provided with a plurality of vertical bores 44 for the reception of the removable prongs or rods 45, each of which may be provided with a suitable handle 46 for manipulating the same. These prongs or rods are preferably pointed as at 47, similar to the prongs 15 described in connection with the other form of the invention, and for the same purpose.

Member 42 is also provided with a transverse bore 50 in which is mounted a pin or shaft 51 upon which is journalled a bail 52 carrying a threaded clamping rod 53.

In the open position of this form of the valve the rods or prongs 45 are entirely withdrawn from the bores 44 and a cover member 56 together with a suitable packing ring 57 is placed upon the top surface of the member 42 and the bail 52 swung to vertical position, as shown in Figures 4 and 5, whereupon the clamping member 53 is manipulated to cause its lower end to engage the boss 58 with which the cover member 56 is provided, thereby positively clamping the cover 56 in position upon the member 42 to close the bores 44 and prevent escape of the mixture through the said bores. In this condition there is obviously no restriction imposed upon the movement of the concrete mixture which would produce the stowing action and this section of the pipe will function in the same manner as any other section. However, if the clamping member 53 be backed off, bail 52 swung upon its shaft 51 to the position shown in Figures 6, 7 and 8 and the rods or prongs 45 introduced into the bores 44 and projected transversely across the pipe section 40 as shown in these said figures, the same restriction or reduction of the cross-sectional area of the pipe section or housing 40 will be accomplished as in the previous form of the invention and the stowing action of the concrete mixture will follow with the result that its motion will be completely stopped.

It is obvious that those skilled in the art may vary the details of construction as well as the precise arrangement of parts without departing from the spirit of the invention, and therefore it is not wished to be limited to the above disclosure except as may be required by the claims.

What is claimed is:

1. In a valve for controlling the flow of plastic concrete mixtures embodying substantial proportions of coarse aggregates which give to such mixtures a strong tendency to stow at restrictions, a housing having a mixture passage; a plurality of spaced prongs movable through a wall of said housing into said passage transversely thereof to partially obstruct the same and thereby produce stowing of the mixture to stop its flow; a cross-head exterior of said housing; yieldable connections between each prong and said cross-head, whereby any prong encountering a piece of aggregate which prevents its full travel into said passage may yield; a rack carried by said cross-head; a gear meshing with said rack; and means for actuating said gear to move the rack and cross-head to cause said prongs to enter into and be withdrawn from said passage.

2. In a valve for controlling the flow of plastic concrete mixtures embodying substantial proportions of coarse aggregates which give to such mixtures a strong tendency to stow at restrictions, a housing having a mixture passage; a plurality of spaced prongs movable transversely through a wall of said housing into said passage transversely thereof to partially obstruct the same and thereby produce stowing of the mixture to stop its flow; a cross-head exterior of said housing; yieldable connections between each prong and said cross-head, whereby any prong encountering a piece of aggregate which prevents its full travel into said passage may yield; a rack carried by said cross-head; a gear meshing with said rack; means for actuating said gear to move the rack and cross-head to cause said prongs to enter into and be withdrawn from said passage; and a guiding roller engaging said rack.

3. A device for controlling the movement of materials which have the property of stowing at partial restrictions, having a passage for the material, and a transverse aperture through a wall of said passage, of a width materially less than that of the passage; restricting means, also of less width than said passage, movable through said aperture into said passage, with substantial space at the sides of said means, whereby said passage will be partially restricted and movement of the material prevented through stowing thereof; means for moving said restricting means; a removable cap arranged to be positioned over said aperture when said restricting means is withdrawn from restricting position; and clamping means including a bail and a screw member carried thereby and engageable with said cap, for positively retaining the latter in aperture-closing position.

JOHN C. MERWIN.
RUDOLPH F. LINDOW.

CERTIFICATE OF CORRECTION.

Patent No. 2,102,571. December 14, 1937.

JOHN C. MERWIN, ET AL.

It is hereby certified that error appears in the printed specification of the above numbered patent requiring correction as follows: Page 3, second column, line 12, claim 2, strike out the word "transversely"; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

from the bores 44 and a cover member 56 together with a suitable packing ring 57 is placed upon the top surface of the member 42 and the bail 52 swung to vertical position, as shown in Figures 4 and 5, whereupon the clamping member 53 is manipulated to cause its lower end to engage the boss 58 with which the cover member 56 is provided, thereby positively clamping the cover 56 in position upon the member 42 to close the bores 44 and prevent escape of the mixture through the said bores. In this condition there is obviously no restriction imposed upon the movement of the concrete mixture which would produce the stowing action and this section of the pipe will function in the same manner as any other section. However, if the clamping member 53 be backed off, bail 52 swung upon its shaft 51 to the position shown in Figures 6, 7 and 8 and the rods or prongs 45 introduced into the bores 44 and projected transversely across the pipe section 40 as shown in these said figures, the same restriction or reduction of the cross-sectional area of the pipe section or housing 40 will be accomplished as in the previous form of the invention and the stowing action of the concrete mixture will follow with the result that its motion will be completely stopped.

It is obvious that those skilled in the art may vary the details of construction as well as the precise arrangement of parts without departing from the spirit of the invention, and therefore it is not wished to be limited to the above disclosure except as may be required by the claims.

What is claimed is:

1. In a valve for controlling the flow of plastic concrete mixtures embodying substantial proportions of coarse aggregates which give to such mixtures a strong tendency to stow at restrictions, a housing having a mixture passage; a plurality of spaced prongs movable through a wall of said housing into said passage transversely thereof to partially obstruct the same and thereby produce stowing of the mixture to stop its flow; a cross-head exterior of said housing; yieldable connections between each prong and said cross-head, whereby any prong encountering a piece of aggregate which prevents its full travel into said passage may yield; a rack carried by said cross-head; a gear meshing with said rack; and means for actuating said gear to move the rack and cross-head to cause said prongs to enter into and be withdrawn from said passage.

2. In a valve for controlling the flow of plastic concrete mixtures embodying substantial proportions of coarse aggregates which give to such mixtures a strong tendency to stow at restrictions, a housing having a mixture passage; a plurality of spaced prongs movable transversely through a wall of said housing into said passage transversely thereof to partially obstruct the same and thereby produce stowing of the mixture to stop its flow; a cross-head exterior of said housing; yieldable connections between each prong and said cross-head, whereby any prong encountering a piece of aggregate which prevents its full travel into said passage may yield; a rack carried by said cross-head; a gear meshing with said rack; means for actuating said gear to move the rack and cross-head to cause said prongs to enter into and be withdrawn from said passage; and a guiding roller engaging said rack.

3. A device for controlling the movement of materials which have the property of stowing at partial restrictions, having a passage for the material, and a transverse aperture through a wall of said passage, of a width materially less than that of the passage; restricting means, also of less width than said passage, movable through said aperture into said passage, with substantial space at the sides of said means, whereby said passage will be partially restricted and movement of the material prevented through stowing thereof; means for moving said restricting means; a removable cap arranged to be positioned over said aperture when said restricting means is withdrawn from restricting position; and clamping means including a bail and a screw member carried thereby and engageable with said cap, for positively retaining the latter in aperture-closing position.

JOHN C. MERWIN.
RUDOLPH F. LINDOW.

CERTIFICATE OF CORRECTION.

Patent No. 2,102,571.  December 14, 1937.

JOHN C. MERWIN, ET AL.

It is hereby certified that error appears in the printed specification of the above numbered patent requiring correction as follows: Page 3, second column, line 12, claim 2, strike out the word "transversely"; and that the said Letters Patent should be read with this correction therein that the same may conform to the record of the case in the Patent Office.

Signed and sealed this 22nd day of February, A. D. 1938.

Henry Van Arsdale,
Acting Commissioner of Patents.

(Seal)

CERTIFICATE OF CORRECTION.

Patent No. 2,102,571.  December 14, 1937.

JOHN C. MERWIN, ET AL.

It is hereby certified that error appears in the printed specification of the above numbered patent requiring correction as follows: Page 3, second column, line 12, claim 2, strike out the word "transversely"; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.